(12) United States Patent
Al-Kazily et al.

(10) Patent No.: US 6,760,694 B2
(45) Date of Patent: Jul. 6, 2004

(54) AUTOMATIC INFORMATION COLLECTION SYSTEM USING MOST FREQUENT UNCOMMON WORDS OR PHRASES

(75) Inventors: Binnur Al-Kazily, Star, ID (US); Craig R. White, Eagle, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 332 days.

(21) Appl. No.: 09/814,267

(22) Filed: Mar. 21, 2001

(65) Prior Publication Data

US 2002/0136279 A1 Sep. 26, 2002

(51) Int. Cl.[7] .......................... G06F 17/00; G06F 17/30
(52) U.S. Cl. ............................................. 704/2; 704/102
(58) Field of Search ............................ 707/102, 104.1, 707/1, 2, 10; 709/224

(56) References Cited

U.S. PATENT DOCUMENTS

| | | | | |
|---|---|---|---|---|
| 5,542,090 A | * | 7/1996 | Henderson et al. | 707/2 |
| 5,864,338 A | * | 1/1999 | Nestor et al. | 715/500.1 |
| 6,078,917 A | * | 6/2000 | Paulsen, Jr. et al. | 707/6 |
| 6,138,155 A | * | 10/2000 | Davis et al. | 709/224 |
| 6,148,289 A | * | 11/2000 | Virdy | 705/1 |
| 6,366,956 B1 | * | 4/2002 | Krishnan | 709/223 |
| 6,385,619 B1 | * | 5/2002 | Eichstaedt et al. | 707/104.1 |
| 6,470,386 B1 | * | 10/2002 | Combar et al. | 709/224 |
| 6,505,201 B1 | * | 1/2003 | Haitsuka et al. | 707/10 |
| 2001/0049677 A1 | * | 12/2001 | Talib et al. | 707/3 |
| 2002/0156760 A1 | * | 10/2002 | Lawrence et al. | 707/1 |
| 2002/0156793 A1 | * | 10/2002 | Jaro | 707/101 |

OTHER PUBLICATIONS

IBM Corporation "Enhanced population of electronic mail subject field", Research Disclosure, Sep. 1998, 3 pages.*
Kobayashi et al "Information Retrieval on the Web", ACM 2000, pp. 144–173.*
Cho et al "Finding replicated web collections", ACM 2000, pp. 355–366.*

* cited by examiner

*Primary Examiner*—Uyen Le (57) ABSTRACT

Systems and corresponding methods that facilitate the automatic organization and collection of electronic information accessed or communicated by a computer user are provided. One embodiment of the system automatically monitors the type and content of electronic files, such as web pages, emails, and other sources for content that are accessed, received, or transmitted by a user. The system then analyzes this information and determines keywords or categories of information included in each content source. The content sources are then classified and referenced in one or more databases for future rapid access.

30 Claims, 3 Drawing Sheets

AUTOMATIC INFORMATION COLLECTION SYSTEM USING MOST FREQUENT UNCOMMON WORDS OR PHRASES

BACKGROUND

1. Field of Invention

The present invention relates generally to computing systems and, more particularly, to collecting, processing, and organizing information accessed by the user of a computing system.

Copyright & Trademark Notice

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and shall not be construed to limit the scope of this invention to material associated with such marks.

2. Related Art

With the advances in computer technology and the advent of globally connected computing networks such as the Internet, vast amounts of information are now literally available at our finger tips. Using a computer, one can access information stored in remote data storage devices and communicate with other computers connected in a communications network. Many computer users actively access and communicate information via a communications network through out the day. This information is typically stored in various storage mediums in the communications network as electronic files. To access a particular piece of information, the user needs to remember the exact storage location or a link that refers to the source of information.

For example, to access a web page, a user will have to know the Uniform Resource Locator (URL) for that web page or a link that references the URL. A URL indicates the storage location of the electronic file that contains the content of the web page. The same is true, for example, if a user would like to reread an email message that was received or sent by the user. Unless; the user can find or remember the exact location or a reference to the electronic file (i.e., the content source) containing the message, the user will be unable to access the information.

Unfortunately, due to memory constraints, a user may not be able to readily remember the storage location or the exact content source for a particular type of information when he or she needs to access the information. It would be very useful, therefore, if information accessed or communicated by the user were automatically organized based on their content or other criteria, so that the user could readily access the content source for the information.

SUMMARY

The present disclosure is directed to systems and corresponding methods that facilitate the automatic organization and collection of electronic information accessed or communicated by a computer user. The system automatically monitors the type and content of electronic files, such as web pages, emails, and other sources for content that are accessed, received, or transmitted by a user. The system then analyzes this information and determines keywords or categories of information included in each content source.

This analysis maybe based on guidelines provided by the user himself or entities who wish to monitor or determine the user's behavior. The system then records each keyword in association with its occurrence in one or more content sources. Various standard and custom templates are then generated by the system providing detailed information about the associations between a certain keyword and one or more content sources where the keyword may be found. The template may be used to organize or retrieve information based on other classifications.

For purposes of summarizing, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

In one embodiment, a method for organizing electronic information includes: parsing a content source for keywords; selecting keywords from the content source based on the type of the content source; associating the keywords with the content source; searching a database for a reference to the content source; if the content source is not referenced in the database, updating the database to include a reference to the content source; updating the database with the keywords currently associated with the content source; removing from the database any keywords not associated with the content source.

In another embodiment, a method for monitoring information accessed and communicated by a user includes: parsing a content source accessed or created by a user for keywords; associating the selected keywords with the content source; updating a database to include a reference to the content source, the keywords associated with the content source, and the association between the keywords and the content source; providing templates that reflect the associations between one or more keywords and one or more content sources based on the information stored in the database.

In still another embodiment, a system for facilitating access to content of a source includes: means for parsing a source; means for selecting one or more keywords included in the source based on the type of the source; means for establishing an association between at least one selected keyword and the source; means for updating a database to include references to the source, the keywords associated with the source, and the association between the keywords and the source; means for accessing the source based on the associations included in the database; and means for evaluating the source based on the associations included in the database.

These and other embodiments of the present invention will also become readily apparent to those skilled in the art from the following detailed description of the embodiments having reference to the attached figures, the invention not being limited to any particular embodiments disclosed.

DETAILED DESCRIPTION

Information management systems and corresponding methods, according to one or more embodiments of the present invention, facilitate and provide electronic services for monitoring the content of information sources accessed, created, or communicated by one or more users. Selected content, such as keywords, included in the information sources, also referred to herein as content sources are classified and stored in a database. Stored also in the database are associations between the selected content and one or more sources that indicate the relationship between the selected content and the source in which the content appears. For example, the associations may reflect the location of a keyword in the source, or the number of times the keyword appears in the source.

The terms "electronic services" and "services" are used interchangeably throughout this patent document. The services provided by the system of this invention, in one or more embodiments, are provided by an on-line service provider. A "service provider" is an entity that operates and maintains the computing systems and environment, such as server system and architectures, that enables the delivery of information. Typically, a server architecture includes the infrastructure (e.g., hardware, software, and communication lines) that stores and offers the electronic or online services.

In the following, numerous specific details are set forth to provide a thorough description of various embodiments of the invention. Of course, certain embodiments of the invention may be practiced without these specific details or with some variations in detail. Embodiments of the present invention are understood by referring to FIGS. 1–3 of the drawings. Throughout the drawings, components that correspond to components shown in previous figures are indicated using the same reference numbers.

Nomenclature

The detailed description that follows is presented largely in terms of processes and symbolic representations of operations performed by conventional computers, including computer components. A computer may be any microprocessor or processor controlled device such as, by way of example, personal computers, workstations, servers, clients, minicomputers, main-frame computers, laptop computers, a network of one or more computers, mobile computers, portable computers, handheld computers, palm top computers, set top boxes for a TV, interactive televisions, interactive kiosks, personal digital assistants, interactive wireless devices, mobile browsers, or any combination thereof. The computer may possess input devices such as, by way of example, a keyboard, a keypad, a mouse, a microphone, or a touch screen, and output devices such as a computer screen, printer, or a speaker. Additionally, the computer includes memory such as a memory storage device or an addressable storage medium. The computer may be equipped with a network communication device such as a network interface card, a modem, or other network connection device suitable for connecting to one or more networks.

The computer may be a uniprocessor or multiprocessor machine. Additionally the computer, and the computer memory, may advantageously contain program logic or other substrate configuration representing data and instructions, which cause the computer to operate in a specific and predefined manner. The program logic may be implemented as one or more modules. The modules may advantageously be configured to reside on the computer memory and execute on one or more processors. The modules include, but are not limited to, software or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and the like.

The program logic conventionally includes data bits manipulated by a processor and maintained within data structures resident in one or more of the memory storage devices. Such data structures impose a physical organization upon the collection of data bits stored within computer memory and represent specific electrical or magnetic elements. The program logic generally includes a sequence of computer-executable steps. These steps generally require manipulations of physical quantities. Usually, although not necessarily, these quantities take the form of electrical, magnetic, or optical signals capable of being stored, transferred, combined, compared, or otherwise manipulated. These signals are interpreted by the processor as bits, values, elements, symbols, characters, text, terms, numbers, records, files, or the like.

It should be understood that manipulations within the computer are often referred to in terms of adding, comparing, moving, searching, or the like. These manipulations may or may not involve a human operator. For the most part, the operations described herein are operations performed by a computer or a machine in conjunction with a human operator or user that interacts with the computer or the machine.

It should also be understood that the programs, modules, processes, methods, and the like, described herein are but an exemplary implementation and are not related, or limited, to any particular computer, apparatus, or computer language. Rather, various types of general purpose computing machines or devices may be used with programs constructed in accordance with the teachings described herein. Similarly, it may prove advantageous to construct a specialized apparatus to perform the method steps described in this patent document by way of dedicated computer systems with hard-wired logic or programs stored in non-volatile memory, such as, by way of example, read-only memory (ROM).

System Architecture

Figure 1:
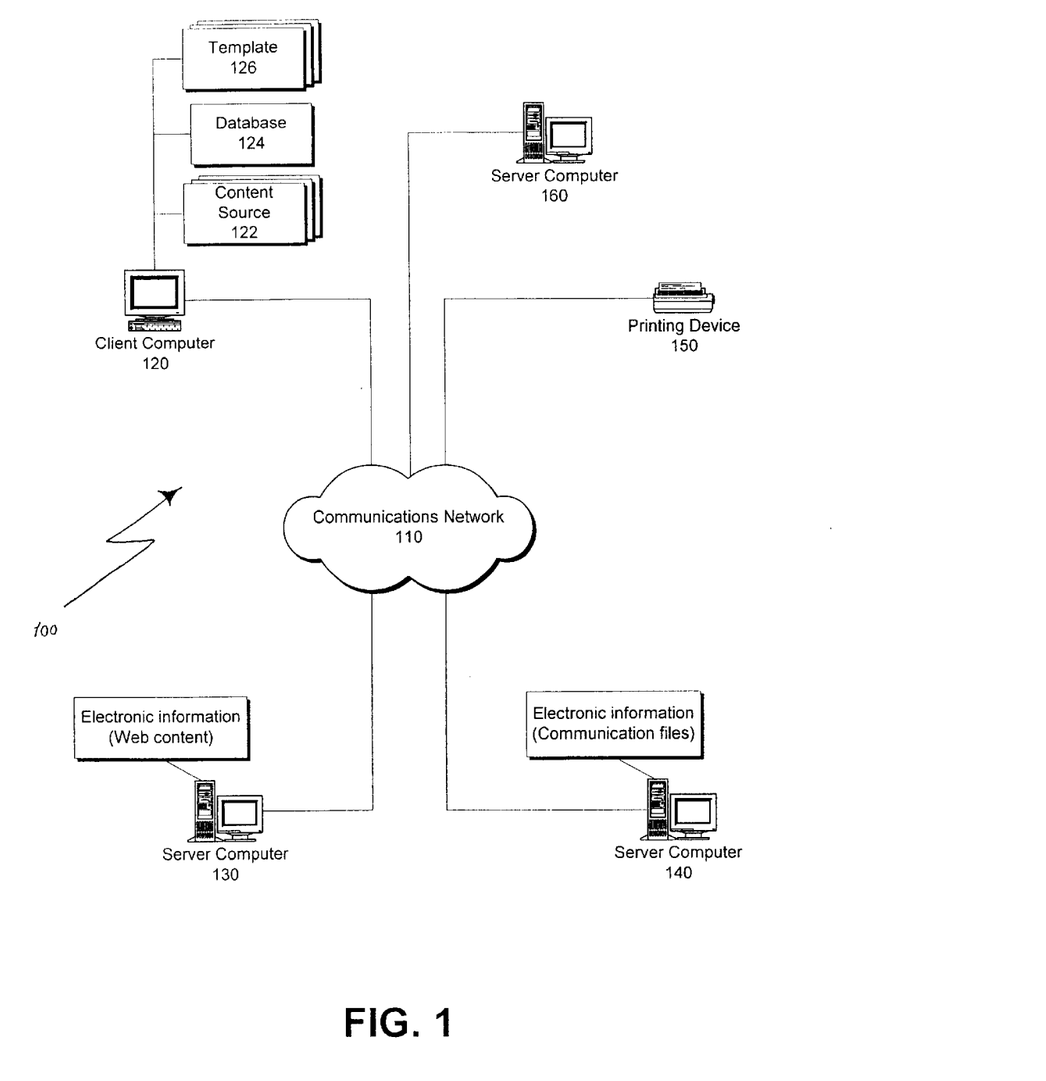
FIG. 1 is a diagram illustrating an environment in which a system of the present invention may operate.

Referring now to the drawings, FIG. 1 illustrates an environment in which an information delivery system 100 according to one embodiment may operate. In accordance with one aspect of the system, the environment includes at least a client computer 120 in communication with one or more communications servers (e.g., server computers 130, 140, and 160) connected to a communications network 110. A printing device 150 may also be attached to communications network 110. The terms "connected," "coupled," or any variant thereof, mean any connection or coupling, either direct or indirect, between two or more elements. The coupling or connection between the elements can be physical, logical, or a combination thereof.

Communications network 110 may be connected to a worldwide network such as the Internet, in a well-known manner. The Internet connects millions of computers around the world through standard common addressing systems and communications protocols (e.g., Transmission Control Protocol/Internet Protocol (TCP/IP), HyperText Transport Protocol) creating a vast communications network. Information on the Internet is stored worldwide as computer files (e.g., Hypertext Mark Up Language (HTML) files). These computer files are stored at the various web servers attached to the Internet, and are commonly referred to as web pages. The collection of said web pages is known as the World Wide Web (WWW). A standard naming convention known as Uniform Resource Locator (URL) has been adopted to represent links and provide access to said web pages and services provided there on.

In accordance with one aspect of the system, a user utilizes client computer 120 to access information sources available on communications network 110. Information or content sources may be stored in various forms and locations through out the communications network 110. For example, information sources can include web pages, email messages, electronic documents, and other types of electronic files that include content created, accessed, or communicated by a user. Content sources can be stored on server systems connected to communications network 110. For example, server computer 130 may be a web server that hosts one or more web sites; or server computer 140 can be an email server for servicing email communication requests submitted by many users. A user may access the information stored in these various sources via client computer 120 if the system is configured to authorize access.

In one or more embodiments, client computer 120 submits a request to access a content source, such as a web page, stored on server computer 130, for example. Server computer 130 examines the requests and, presuming proper authentication and authorization, services the request by forwarding the requested information included in the content source. If server computer 130, is a web server for example, then the submitted request includes the URL for the web page requested. The content source for a web page includes one or more electronic files formatted for browsing by application software 222, such as a browser.

The browser is a software program that allows the user to parse web pages available on server computer 130 by referencing the IJRL for the source. In one embodiment, the browser may be a standard browser such as the Netscape Navigator® developed by Netscape, Inc., Mountain View, Calif., the Microsoft Internet Explorer® developed by Microsoft Corporation, Redmond, Wash., a WebTV, an embedded web browser on a handheld device, or the like. In another embodiment, other types of access software, such as, by way of example, custom network browsers, communication software, cable modem software, point-to-point software, multi-point software, custom emulation software, and the like, can be used.

Server computer 130 in response to receiving a request that includes the URL for a web page, forwards the electronic file referenced by the URL to client computer 120. A user may equally access other types of information stored on other servers attached to communications network 110, by submitting a request to the server computer that includes the content source containing that information. For example, to retrieve his or her email messages, a user may logon to server computer 140 and request to access email messages stored on server computer 140. Presuming successful authentication and proper authorization, server computer 140 services client computer 120's request by forwarding electronic files containing email messages stored on server computer 140.

The electronic files and other sources of information stored on server computers attached to communications network 110 include the contents (e.g., web pages and email messages) requested by the user. For the purposes of this patent document, such source of information is referred to as content source 122. Depending on implementation, in embodiments of the system, when client computer 120 submits a request to access the content of content source 122 a full or a partial copy of content source 122 may be forwarded and stored on client computer 120, as shown in FIG. 1. Content source 122, alternatively may not be copied and stored on client computer 120, but may be stored on the server computers, or any other device attached to communication networks 110 that can be accessed by client computer 120. By way of example, however, FIG. 1 illustrates content source 122 as stored on client computer 120 without intending to limit the scope of the invention only to such application.

One of ordinary skill in the art will appreciate that communications network 110 may advantageously be comprised of one or a combination of other types of networks without detracting from the scope of the invention. Communications network 110 can include, for example, local area networks (LANs), wide area networks (WANs), public internets, private intranets, a private computer network, a secure internet, a private network, a public network, a value-added network, interactive television networks, wireless data transmission networks, two-way cable networks, satellite networks, interactive kiosk networks, and/or any other suitable communications network.

In one or more embodiments of the system, application software 222 (FIG. 2B) is implemented to monitor a user's interaction with client computer 120 and to determine the content sources accessed by the user. The application software 222 for monitoring user interaction may be fully or partially executed on client computer 120, server computer 160, or other computing device attached to communication network 110. Application software 222, for example, parses content of one or more communications such as email messages received or sent by the user. The application software 222 also parses the content of other documents created, edited, or viewed by the user, for example. Depending on the type of content source parsed, application software 222 searches for and records certain keywords in database 124 during or after user access.

For example, if the user receives an email message or opens an email message for viewing, application software 222 may parse the heading and the content of the email for the name of the sender, the time and date the message was sent, the subject heading of the email, and addresses of other recipients. In addition, the application software 222 may parse the content of the email for uncommonly used words or phrases that most frequently appear in the email. Application software 222 may be implemented to analyze the content of the message and select or recommend one or more keywords that summarize or relay the subject matter of the message.

The same approach may be applied to the content of a web page accessed by the user, for example. Application software 222 may parse various sections of a web page, such as the web page's meta tags, headings, and content. The section of a web page content source that includes the meta tags includes such terms as title of the page, and keywords that relate or describe the content of the page. This information is used by a search engine to identify the contents of the web page. This information, thus can be used by the application software 222 of the system to identify the contents of the web page, as well.

Similarly, the same approach may be applied to other content sources accessed by the user. Examples of various content sources are documents containing text, spread sheets, presentations, and email attachments. Application software 222 can be implemented to parse each content source depending on its type and the nature of information included therein to identify and select one or more keywords that describe or relate the subject matter of the content source, or other statistical information about the content source, examples of which are discussed above.

Database 124 in addition to said selected keywords, in some embodiments, also includes a reference to the content source that includes or relates to the keywords. The references may include the URL for a web site, the path and filename for a document, dynamic links, or other information that would allow a user quickly access or find the referenced content source in communications network 110. As such, database 124, in accordance with one aspect of the system, is a relational database that includes keywords, references to content sources, and associations between the keywords and the references.

Associations are logical links between the references and keywords indicating a relationship between the two. In some embodiments, an association or a link is recorded in the database if a keyword is included in a content source or if the keyword relates to the content of the content source is any other manner. A keyword may be associated with one or more references, as different content sources may contain the same keyword. A reference may be associated with one or more keywords, as a content source may contain more than one or more keywords.

One or more templates 126 are implemented, in accordance with one or more embodiments of the invention to provide viewing filters that present the contents of database 124 to a user. In one embodiment, template 126 can be implemented to list the keywords included in database 124 in alphabetic or other logical order. The references associated with each keyword may be listed in a line following the keyword or in other display formats that represent the association between the keyword and the referenced content source. In the same or another embodiment, template 126 may be implemented to list the references included in database 124 in alphabetic order or other logical order. The keywords associated with each reference may be listed in a line following the keyword or other desirable display formats.

Application software 222 may be implemented to provide viewing templates 126 that allow a user to view the keywords or references by grouping them into various categories. A template may be implemented to group keywords based on their appearance in different types of content sources. For example, in one embodiment, keywords appearing in web sites are grouped in a first group and keywords appearing in email messages are grouped in a second group. In one or more embodiments, the content sources may also be grouped in different categories, for example, based on the subject matter of their content, so a user can easily refer back or find a content source that he or she had accessed earlier by remembering the topic included in the source. Other grouping or classifying schemes may be used or implemented as desired. Examples of such groups or classifications included: news groups, analyst reports, market data, etc.

As used herein, the terms server computer or communications server are to be viewed as designations of one or more computing systems that include server software for servicing requests submitted by client devices or other computing systems connected to communications network 110. These terms are not to be otherwise limiting in any manner. The server software and application software 222, for example, may be comprised of one or more modules that execute on one or more computing systems, as described in further detail below.

Hardware & Software Environments

As it is described in further detail below, typically, a computing system is composed of two environments, a software environment and a hardware environment. The hardware environment includes the machinery and equipment that provide an execution environment for the software. On the other hand, the software provides the execution instructions for the hardware.

In operation, a computing system needs both hardware and software to function. The software can be divided into two major classes including system software and application software 222. System software includes control programs, such as the operating system (OS) and information management systems that instruct the hardware how to function and process information. An example of system software is Microsoft Windows 2000® operating system generally used for managing the operation of personal computers.

Application software 222 is a program that performs a specific task. In embodiments of the invention, system and application software 222 are implemented and executed on one or more hardware environments to parse a content source for keywords, identify and select certain keywords from the content source based on the type of the content source, and associate the keywords with the content source. The database is then updated to include the identified keywords and references to the content sources that include the keywords.

Figure 2A:
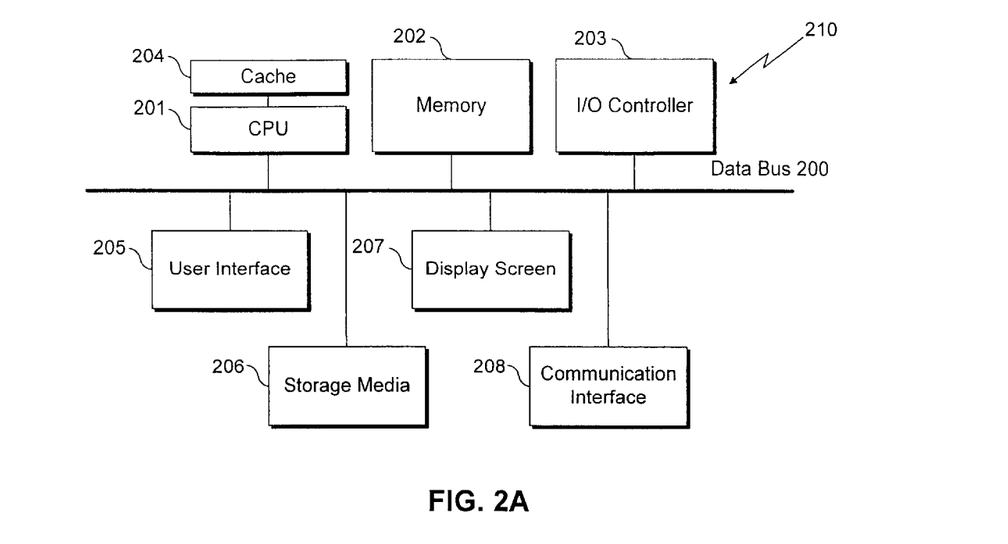
FIGS. 2A and 2B are block diagrams illustrating the hardware and software environment in a general computing system, in accordance with one or more aspects of the invention.
Figure 2B:
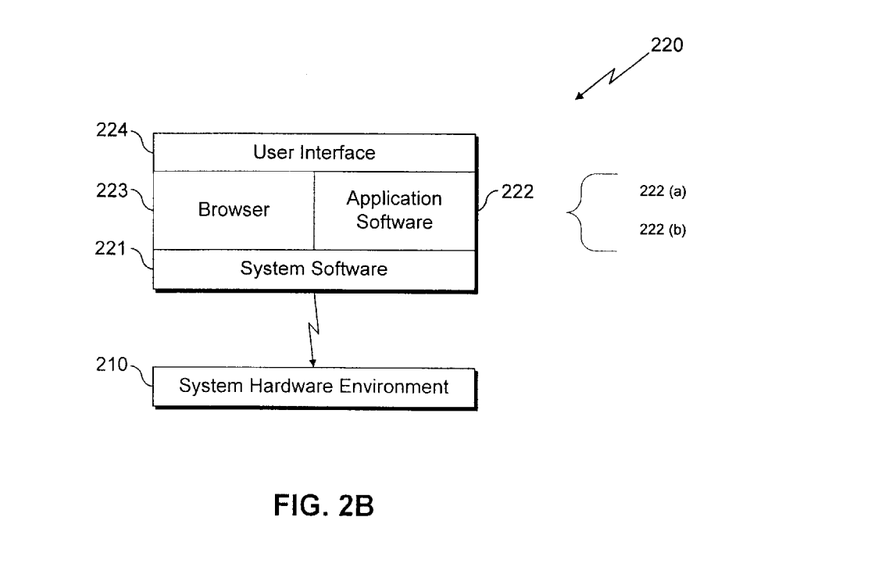

The invention may be practiced either individually or in combination with suitable hardware or software architectures or environments described in further detail below. For example, client computer 120 and server computers 130, 140, and 160 may be implemented in association with computing system 210 (FIG. 2A). Client and server software running on the above systems, including application software 222 for monitoring and managing information accessed by a user may be implemented in association with one or multiple modules as software system 220 (FIG. 2B). The following hardware and software embodiments are provided by way of example. It should be noted that certain hardware and software components may be interchangeably implemented in form of software or hardware, in one or more embodiments of the invention.

Hardware Environment

An embodiment of the system can be implemented as computer software in the form of computer readable code executed on a general purpose computing system 210, in accordance with one or more aspects of the invention. FIG. 2A illustrates an example of the components of computing system 210. Computing system 210 includes a central processor unit (CPU) 201, a main memory 202, an input/output controller 203, optional cache memory 204, user interface devices 205 (e.g., keyboard, pointing device, etc.), storage media 206 (e.g., hard drive, memory, etc.), a display screen 207, a communication interface 208 (e.g., a network card, a modem, or an integrated services digital network (ISDN) card, etc.), and a system synchronizer (e.g., a clock, not shown in FIG. 2A).

Processor 201 may or may not include cache memory 204 utilized for storing frequently accessed information. One or more input/output devices such as a printing or a scanning device may be attached to computing system 210. A communication mechanism, such as a bi-directional data bus 200, can be utilized to provide for means of communication between system components. Computing system 210 may be capable of communicating with other systems through communication interface 208.

In one or more embodiments, computing system 210 may not include all the above components, or may include additional components for additional functionality or utility. For example, computing system 210 can be a laptop computer or other portable computing device that can send messages and receive data through communication interface 208. Computing system 210 may also be embodied in an embedded system such as a set-top box, a personal data assistant (PDA), a wireless communication unit (e.g., cellular phone), or other similar hardware platforms that have information processing and/or data storage and communication capabilities.

In embodiments of the system, communication interface 208 can send and receive electrical, electromagnetic, or optical signals that carry digital data streams representing various types of information including program code. If communication is established via the Internet 140, computing system 210 may transmit program code through an Internet connection. The program code can be executed by central processor unit 201 or is stored in storage media 206 or other non-volatile storage for later execution.

Program code may be transmitted via a carrier wave or may be embodied in any other form of computer program product. A computer program product comprises a medium configured to store or transport computer readable code or a medium in which computer readable code may be embedded. Some examples of computer program products are CD-ROM disks, ROM cards, floppy disks, magnetic tapes, computer hard drives, and network server systems.

In one or more embodiments of the invention, processor 201 is a microprocessor manufactured by Motorola, Intel, or Sun Microsystems Corporations. The named processors are for the purpose of example only. Any other suitable microprocessor, microcontroller, or microcomputer may be utilized.

Software Environment

FIG. 2B illustrates computer software 220 suited for managing and directing the operation of the hardware environment described above. Computer software 220 is, typically, stored in storage media 206 and is loaded into memory 202 prior to execution. Computer software 220 includes system software 221 and application software 222. Depending on system implementation, certain aspects of computer software 220 can be loaded on one or more computing systems.

System software 221 includes control software such as an operating system that controls the low-level operations of computing system 210. Low-level operations include the management of the system's resources such as memory allocation, file swapping, and other core computing tasks. In one or more embodiments of the invention, the operating system is Microsoft Windows 2000®, Microsoft Windows NT®, Macintosh OS®, or IBM OS/2®. However, any other suitable operating system may be utilized.

Application software 222 can include one or more computer programs that are executed on top of system software 221 after being loaded from storage media 206 into memory 202. In a client-server architecture, application software 222 may include a client software 222(a) and/or a server software 222(b). Referring to FIG. 1 for example, in one embodiment of the invention, client software 222(a) is executed on client computer 120 and server software 222(b) is executed on server computers 130, 140, and 160.

Computer software 220 may also include web browser software 223 for browsing the Internet. Further, computer software 220 includes a user interface 224 (e.g., a Graphical User Interface (GUI)) for receiving user commands and data. The commands and data received are processed by the software applications that run on the computing system 210.

The hardware and software architectures and environments described above are for purposes of example only. Embodiments of the invention may be implemented in any type of system architecture or processing environment.

Application Software for Managing Information Sources Accessed by a User

Embodiments of the invention are described by way of example as applicable to systems and corresponding methods that facilitate managing and classifying information about sources accessed by a user in a computing environment. In this examplary embodiment, the application software 222 is implemented to monitor user interaction with a computing system, parse the content of sources accessed by the user for certain keywords, and organize and association the keywords with the sources so that the sources can be easily located or identified at a later time.

To describe this exemplary embodiment, references are made to client computer 120, printing device 150, and server computers 130, 140, and 160 connected in a communications network 110. It should be noted, however, that this exemplary embodiment is not to be construed to limit the scope of the invention only to a networked computing environment. The invention, in various embodiments, may be applied in any environment that supports a user's ability to access information from various content sources, for example a network TV environment.

Figure 3:
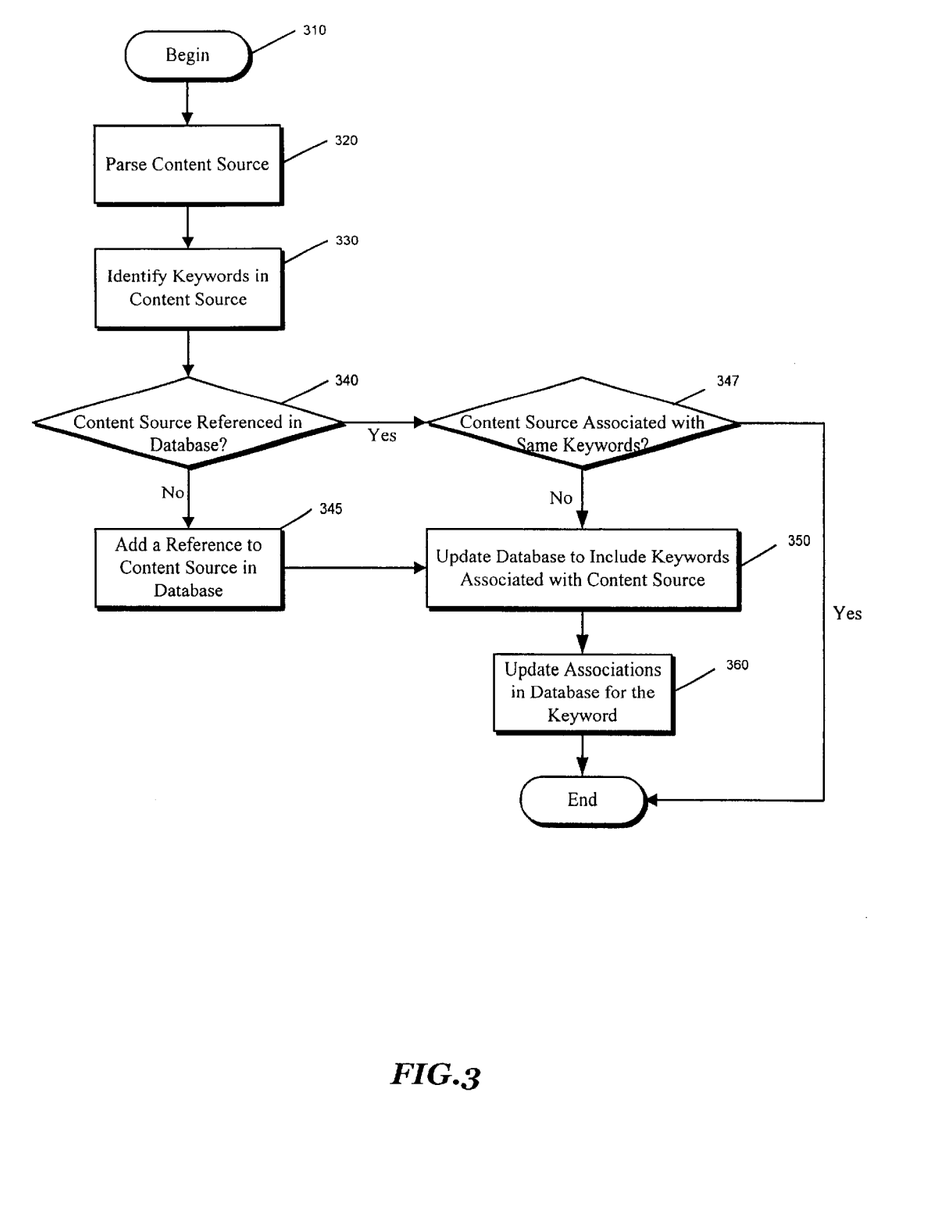
FIG. 3 is a now diagram of a method of accessing one or more content sources, in accordance with one or more embodiments of the system illustrated in FIG. 1.

Referring to FIGS. 1 and 3, in accordance with one aspect of the invention, a user uses client computer 120 to access content source 122. Content source 122 may be resident locally on client computer 120, or remotely on one of the server computers attached to communications network 110. For example, content source 122 may be a web page accessible on server computer 130, or an email message stored on server computer 140. At step 310, application software 222 is initiated. The application software 222 executes fully or partially on client computer 120 and monitors and parses the content of content source 122 at step 320. The parsing step may take place either during or after the user has accessed content source 122.

At step 330, application software 222 identifies certain keywords in the content source. Keywords are identified depending on the type of content source accessed. For example, if content source 122 is a web page then application software 222 identifies words or phrases included in the meta tags and header portions as keywords. As another example, if content source 122 is an email message, then application software 222 identifies words or phrases that define the destination, recipients, and other information about the email message. In certain embodiments, the body of the email message, or the web page is also parsed to determine the subject matter contained in the message or web page. Phrases and words contained in the body, or related words and phrases describing the content of the message or the web page, may thus be selected by application software 222 as keywords.

In one or more embodiments, the identified keywords are associated with content source 122. The association between the keywords and content source 122 may be established by a logical link, for example. Other means suitable for associating content source 122 and the keywords identified therein may be used. For example, in a certain embodiment, a temporary electronic file may be created by application software 222 to include all keywords identified for a parsed content source. As such, if more than one content source is parsed at a time, then temporary electronic files are generated for each content source. Listed keywords in each file are thus associated with the content source referenced in the file.

At step 340, application software 222 searches database 124 to determine whether content source 122 is referenced in database 124. Database 124 contains a collection of keywords identified in other content sources previously accessed by the user. Database 124 also contains references to content sources (e.g., web pages, email messages, electronic documents, and presentations) previously accessed by the user and associations logically linking the content sources with keywords stored in database 124. Thus, if a content source has been already accessed by the user, database 124 would include a reference to the content source and the keywords associated with the version of the content source at the time the content source was accessed.

Depending on the type of the content source, the keywords associated with a content source may change from one day to the next. For example, the content of web pages or electronic documents can change as they are modified and edited. Once at step 340 it is determined that content source 122 is referenced in database 124, then at step 347 it is determined if content source 122 in its current version is associated with the same keywords as those included in database 124. If the associated keywords are the same then it means that the content of the current version of content source 122 has not changed substantially in comparison with the content of the previous version. Thus no changes are made to the content of database 124.

If, however, at step 340 it is determined that content source 122 is not referenced in database 124, then at step 345 the application software 222 adds an entry to database 124 that includes a reference to content source 122. Referring to FIG. 3, once a reference to content source 122 is added to database 124, or after it is determined that content source 122 is no longer associated with the same keywords as previously included in database 124, then at step 350 application software 222 updates database 124 to include keywords currently associated with content source 122. That is, any keywords included in database 124 that are no longer associated with content source 124 are removed from database 124; and any keywords that are not included in database 124 but are currently associated with content source 122 are added to database 124.

At step 360, the associations included in database 124 are updated to reflect the appropriate association between keywords and content source references stored in database 124 after step 350 update. As described earlier, the associations included in database 124 are logical links between the keywords and referenced stored therein. A link between a keyword and a reference indicates that the keyword is related or can be found in the content source. Embodiments of the invention are implemented so that application software 222 can direct a user to one or more content sources in which a keyword can be found if the user selects the keyword. Further, application software 222 can be also implemented to direct a user to one or more keywords included in a content source, if the user selects the content source.

Referring to FIG. 1, templates 126 are implemented in accordance with one or more embodiments of the system to provide a user with the option to sort or filter the information stored in database 124. The templates may be implemented to automatically search database 124 for different types or categories of information, and to display the results of the search in a particular format for user's viewing. For example, in one embodiment, a template may be implemented to display a list of web pages accessed by a user within a certain time period. In another embodiment, a template may be implemented to display a list of all incoming and outgoing messages that are related to a particular keyword, for example. In yet another embodiment, a template may include one or more headings for various subject matters grouped or classified separately, such that each heading corresponds with one or more entries that include the title of a document (or the subject line for an electronic message), the author of the document (or electronic message), the date of creation, and other relevant details about the document.

Other variations and conditions may be implemented in a template. For example, a template may be implemented to display a list of keywords included in database 124 and in association with each keyword, a list of web pages, email messages, and electronic documents referenced in database 124 for the particular keyword. The template may be implemented to allow a user to perform a search on a keyword and in response provide the result of the search to the user. The search result may include a list of content sources that include the keyword or are related to it. Conversely, a template may be implemented to display a list of content sources referenced in database 124 and in association with each content source, a list of keywords included in database 124 for that content source. The content sources and keywords may be grouped in logical order or categorically, in accordance with one aspect of the invention.

One or more embodiments of the system may be implemented to include after hours searching features. In such embodiments, the system is designed or programmed to search communications network 110 for content sources that relate to keywords stored in the database during a certain time period. For example, the system may be programmed to search the World Wide Web overnight for web pages with search terms that are selected from keywords stored in the database on that day. The results of the search can be then printed on printing device 150, or otherwise stored on client computer 120 for future user access. Other search features may also be implemented. The searches may be based on keywords stored in the database, or classifications by which the content sources are sorted or arranged in the database.

Thus, methods and systems for collecting and organizing information about the content of sources accessed by a user are provided. The embodiments described above are to be considered in all aspects as illustrative only and not restrictive in any manner. Thus, other system architectures, platforms, and implementations that can support various aspects of the invention may be utilized without departing from the essential characteristics as described herein. These and various other adaptations and combinations of features of the embodiments disclosed are within the scope of the invention. The invention is defined by the claims and their full scope of equivalents.

What is claimed is:

1. A method for facilitating review of information that has been accessed by a user comprising:

parsing a content source;

identifying one or more keywords included in the content source by identifying one or more uncommonly used words or phrases that most frequently appear in the content source;

establishing one or more associations between said one or more keywords and the content source;

updating the content of a database that is separate from and that excludes the content source based on said associations, wherein the database contains references to one or more content sources, keywords, and associations between said one or more content sources and keywords so as to enable searching for at least one of content sources that comprise a given keyword and keywords that are contained by a given content source.

2. The method of claim 1, wherein:

the association between a keyword and a content source indicates that the content source contains the keyword.

3. The method of claim 2, further comprising:

accessing the content source based on the associations included in the database.

4. The method of claim 2, further comprising:

evaluating the content source based on the associations included in the database.

5. The method of claim 3 wherein the act of accessing the content source includes:

selecting a keyword associated with the content source from the database.

6. The method of claim 4 wherein the act of evaluating the content source includes:

viewing one or more keywords associated with the content source, in response to selecting a reference to the content source from the database.

7. The method of claim 1 wherein the act of updating the content of the database comprises:

storing in the database a reference to the content source, if the database does not include a reference to the content source.

8. The method of claim 7 wherein the act of updating the content of the database further comprises:

storing in the database said one or more keywords associated with the content source, if the database does not include said one or more keywords.

9. The method of claim 8 wherein the act of updating the content of the database further comprises:

storing in the database the associations between said one or more keywords and the content source, if the database does not include the associations.

10. The method of claim 9 wherein the act of updating the content of the database further comprises:

removing associations between one or more keywords included in the database and the content source, if the content source is no longer associated with said one or more keywords.

11. The method of claim 10 wherein the act of updating the content of the database further comprises:

removing a keyword from the database, if the keyword is no longer associated with any content source referenced in the database.

12. The method of claim 10 wherein the act of updating the content of the database further comprises:

removing a reference to a content source from the database if the content source is no longer associated with any keyword included in the database.

13. The method of claim 10 further comprising:

searching a communications network for content sources that include one or more of said keywords stored in the database.

14. The method of claim 10 further comprising:

searching one or more communications networks for content sources that are relevant to the content sources referenced in the database.

15. The method of claim 14 further comprising:

providing the search results to the user.

16. A system for facilitating review of information that has been accessed by a user, said system comprising logic code configured for execution by a processor, wherein execution of the code can cause the system to perform the following acts:

parsing a content source;

identifying one or more keywords included in the content source by identifying one or more uncommonly used words or phrases that most frequently appear in the content source;

establishing an association between said one or more keywords and the content source; and updating content of a database that is separate from and that excludes the content source based on said association, wherein the database contains references to one or more content sources, keywords, and associations between said one or more content sources and keywords so as to enable searching for at least one of content sources that comprise a given keyword and keywords that are contained by a given content source.

17. The system of claim 16, wherein execution of the code can cause the system to further perform the following act:

storing in the database said one or more keywords associated with the content source, if the database does not include said one or more keywords.

18. The system of claim 17, wherein execution of the code can cause the system to further perform the following act:

storing in the database the associations between said one or more keywords and the content source, if the database does not include the associations.

19. The system of claim 18, wherein execution of the code can cause the system to further perform the following act:

removing associations between one or more keywords included in the database and the content source; if the content source is no longer associated with said one or more keywords.

20. The system of claim 19, wherein execution of the code can cause the system to further perform the following act:

removing a keyword from the database, if the keyword is no longer associated with any content source referenced in the database.

21. The method of claim 1, further comprising presenting the content of the database to the user in a template.

22. The method of claim 21, further comprising filtering the information stored in the database with the template according to one or more keywords to enable a user to identify content previously accessed by the user that is relevant to the one or more keywords.

23. The method of claim 1, wherein updating the content comprises storing the number of times the one or more keywords appear in the content source.

24. The method of claim 1, wherein updating the content comprises storing a universal resource locator (URL) or a path and file name.

25. The system of claim 16, wherein execution of the code can cause the system to further perform the following act:

presenting the content of the database to the user in a template.

26. The system of claim 16, wherein execution of the code can cause the system to further perform the following act:

filtering the information stored in the database according to one or more keywords to enable a user to identify content previously accessed by the user that is relevant to the one or more keywords.

27. The system of claim 16, wherein execution of the code can cause the system to further perform the following act:

storing the number of times the one or more keywords appear in the content source.

28. The system of claim 16, wherein execution of the code can cause the system to further perform the following act:

updating the content by storing a universal resource locator (URL) or a path and file name.

29. The method of claim 1, wherein the content source comprises a web page.

30. The method of claim 16, wherein the content source comprises a web page.

* * * * *